United States Patent [19]

Jones et al.

[11] 3,927,752

[45] Dec. 23, 1975

[54] KEYBOARD AND ENCODING SYSTEM FOR PHOTOCOMPOSITION OF SCIENTIFIC TEXT INCLUDING MULTILINE MATHEMATICAL EQUATIONS

[75] Inventors: Roger W. Jones, Sayville, N.Y.; J. C. Fineman, Louisa, Va.; James R. Roesser, Brookhaven, N.Y.

[73] Assignee: American Institute of Physics, New York, N.Y.

[22] Filed: Jan. 22, 1974

[21] Appl. No.: 435,477

[52] U.S. Cl. .................................... 197/19; 197/98

[51] Int. Cl.[2] ........................... B41J 5/30; B41J 5/10

[58] Field of Search ............ 197/1.5, 1 A, 9, 19, 20, 197/98; 178/17 R, 17 A, 17 B, 17 C, 17 D, 17 E; 235/145 R, 145 A, 146

[56] References Cited

UNITED STATES PATENTS

| | | | |
|---|---|---|---|
| 2,947,357 | 8/1960 | Bafour et al. | 197/1.5 |
| 3,530,239 | 9/1970 | Corell et al. | 178/17 C |

*Primary Examiner*—J. Reed Fisher

*Attorney, Agent, or Firm*—Lane, Aitken, Dunner & Ziems

[57] ABSTRACT

A main typographic keyboard having character keys and operation keys is employed in connection with an auxiliary keyboard having "shift" keys to provide an encoded output representing regular text as well as displayed mathematical expressions for computer-assisted photocomposition. The main keyboard permits multiline mathematical expressions to be typed in a predetermined serial order using character keys in conjunction with a special subset of operation keys for designating mathematical formats, such as a fraction, and for delineating their component parts by logical "punctuation marks". The shift key set on the auxiliary keyboard is used in conjunction with the main keyboard for (1) capitalizing letters, (2) changing character sets and fonts, (3) indicating a superior or inferior position for a character relative to a line and (4) designating boldface characters. A shift key for any one of these four functions can be combined with other shift keys for any or all other corresponding functions. A system for monitoring keyboarded data is also disclosed.

10 Claims, 18 Drawing Figures

KEYBOARD AND ENCODING SYSTEM FOR PHOTOCOMPOSITION OF SCIENTIFIC TEXT INCLUDING MULTILINE MATHEMATICAL EQUATIONS

BACKGROUND OF THE INVENTION

The invention relates generally to the field of automatic typesetting, and more specifically to apparatus for generating encoded printing data for automatic photocomposition systems, particularly by means of typographic keyboard encoding.

Although high-speed photocomposers are revolutionizing printing, their application to the typesetting of complex scientific text has been delayed by the absence of a practicable system for handling sophisticated mathematical expressions. The printing of scientific text presents two distinct problem areas which standard monotype or hot-metal systems and typewritten composition systems fail to accommodate satisfactorily. The first difficulty is in furnishing type faces for the vast set of special characters, far beyond the regular alphabet in number, which are frequently necessary in symbolic mathemetical expression. The ordinary typewriter keyboard is limited primarily to upper and lower case characters. Simply adding sets of keys for the Greek alphabet and mathematical symbols such as the integral sign would increase the number of keys beyond a manageable size.

Attempts to cope with the general aspects of the character set problem are represented by U.S. Pat. Nos. 3,530,239 and 2,947,357 to Corell et al and Bafour et al respectively. In Corell et al, for example, the identity of characters represented by the keys of a "second character keyboard" is temporarily designated by depressing a single character set key on a separate command keyboard. A key of variable identity on the second character keyboard can be made to represent a letter of the Greek alphabet by depressing a Greek alphabet key on the command keyboard before striking the key on the second character keyboard. In this way the number of characters available to the typist can be multiplied. Precedence codes have also been used in the past to affect the identity of succeeding characters. Once struck, however, precedence codes apply either to the next character alone or to all succeeding characters until another code is entered. If only one succeeding character is affected, then the precedence code must be struck again for each character in a string of similar special characters such as a series of Greek letters, resulting in an excessive number of key strokes. If, on the other hand, the precedence code continues to apply until "turned off", then the typist must remember to change out of the special mode at the proper time. Special characters occur in mathematical text one at a time, in small groups or clusters, and in long strings. Thus neither type of precedence code operation is really suitable.

Printing mathematical text requires the availability of not only different character sets but also different fonts, at least six different inferior and superior character positions relative to a line, and whether boldface or regular face printing is required. In addition, the system should be capable of indicating a capital-shift, a different character set or font, a different relative character position and boldness all at the same time or any desired lesser combination.

The other major problem peculiar to mathematical composition is that of displayed formulas and other mathematical expressions. Because mathematical expressions often involve a two-dimensional arrangement of symbols, such expressions, even of ordinary complexity, cannot be printed simply as rows of text. Instead of keyboarding formulas like text, monotype composition requires hand-setting of mathematical expressions. In typewriter composition, a similar degree of manipulative skill is often required and the resulting product is of much lower quality than monotype composition because of the poor tolerances, lack of justification and small character set typewriter composition makes available.

Automatic photocomposition has the potential to solve both of the foregoing problems in composing scientific text while producing potentially higher quality copy than monotype, eventually at lower cost. First, photocomposition readily provides a practically unlimited number of character sets, special symbols and fonts. Second, automatic photocomposition units are already operated by digital signals produced by computers programmed to automatically justify, hyphenate, tabulate and perform other functions in typesetting regular test. Since manually arranging the elements of a mathematical expression involves a number of discrete, logically separable steps, computerized photocomposition offers tremendous potential in automatically carrying out the various steps in setting up complicated equations and other expressions.

SUMMARY OF THE INVENTION

The general purpose of the invention is to automate the composition of scientific text including complex mathematical expressions. Another object of the invention is to facilitate keyboarding of data for computer-assisted photocomposition of scientific text by means of a special keyboard organization.

The present invention provides a special keyboard and encoding system for composing displayed mathematics and designating special symbols. The keys of a main keyboard, ordinarily representing the English alphabet, numerals, and punctuation marks, as on a standard typewriter keyboard, are altered in significance by the simultaneous depression of one or more "shift" keys on an auxiliary keyboard. The shift key set on the auxiliary keyboard is used in conjunction with the main keyboard for (1) capitalizing letters, (2) changing character sets and fonts, (3) indicating a superior or inferior position for a character relative to a line and (4) designating boldface characters. A shift key for any one of these four functions can be combined with other shift keys for any or all other corresponding functions represented on the auxiliary keyboard.

Another aspect of the invention concerns a system facilitating the writing of mathematical expressions by "linearization" of their component parts as well as their individual terms. The system allows "multiline mathematical expressions" to be keyboarded linearly or serially, like running test, with a minimum number of extra key strikes. Multiline expressions are defined as those having a multilevel organization of component parts in a direction perpendicular to a line of text. Thus, the equation $f = ax$ is not a multiline expression, but the equation $$f = \frac{1}{a+x},$$

is a multiline expression. The phrase serial keyboarding or writing means typing the component parts of an expression, such as the numerator and the denominator of a fraction, in a predetermined sequential order.

To write multiline mathemetical expressions serially, a main keyboard is employed using "character keys" in conjunction with a set of "operation keys". The term character key is defined to mean a key whose actuation indicates one particular character out of a set of characters, for example, the letter "B" of the English (Latin) alphabet. The term character is defined to include letters, numerals, mathematical symbols and punctuation marks. The operation keys include a plurality of format keys indicative of different mathematical expression formats and a plurality of delineator keys including a separator key and a terminator key. The separator and terminator keys provide a means for logically punctuating the component parts of an expression. Actuation of one of the format keys indicates that subsequently keyed characters are to be printed in one location relative to a mathematical symbol according to the format represented by the format key until the occurrence of a delineator key. The separator key indicates that subsequently keyed characters are to be printed in another location relative to the preceding symbol according to the format represented by the preceding format key. The terminator key indicates that subsequently keyed characters are not to be influenced by a preceding format key.

The keyboard output is digitally coded in separate channels, one multibit channel to indicate actuation of the character and operation keys and several independent channels for the auxiliary keyboard. The encoded output is fed to a programmed decoding system such as a general purpose computer for providing suitable outputs in the form of paper tape, for example, to direct an automatic photocomposer to carry out the indicated typesetting operations. The exposed paper containing text and mathematical expressions which the photocomposer produces is handled thereafter in the conventional manner. That is, a negative is made of the photocomposer paper product and that negative is used to make a positive plate inked for use in a regular photo-offset press which operates according to the principles of standard offset lithography in which the image on the plate is transferred in the negative to a rubber blanket from which the copy is printed.

The decoding system is also used to produce an output to a teletypewriter automatically driven by electrical signals to provide hard copy, approximately in real time, to monitor the keyboarded data. The depression of an operator key on the main keyboard causes a corresponding symbol to be printed on the teletypewriter copy to punctuate serially typed mathematical expressions. Characters altered by depression of one or more auxiliary shift keys are indicated, where necessary, by auxiliary marks made by the teletypewriter. For example, a V-shaped automatic over-strike can be used to indicate that a character is to be printed as a superscript to a preceding character.

BRIEF DESCRIPTION OF THE DRAWING

In FIGS. 7B and 7C, and subsequent illustrations, the sequence of keyboarded characters and the desired expression designated thereby are shown to the left and right, respectively, of the arrow in each drawing.

DESCRIPTION OF THE PREFERRED EMBODIMENTS

Figures 1, 4, 5:
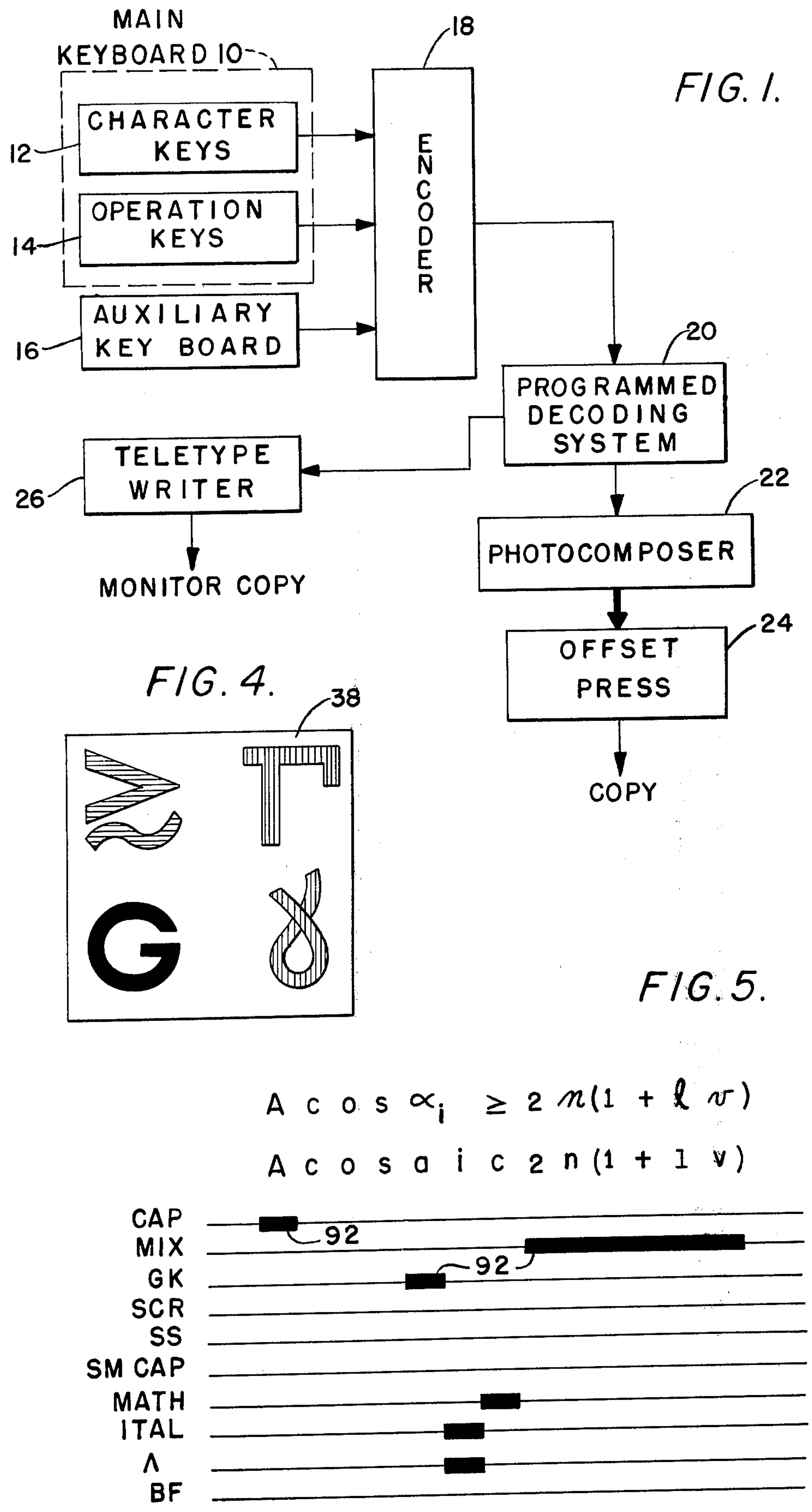
FIG. 1 is a block diagram illustrating the keyboard organization in relation to the other components of the photocomposition system according to the invention.
FIG. 4 is a schematic diagram illustrating a single character key of the main keyboard of FIG. 2 in more detail.
FIG. 5 is a schematic diagram representing sample monitor copy produced by the teletypewriter 26 of FIG. 1 with the desired expression appearing above the keyboard characters for comparison.

FIG. 1 shows a generalized keyboard encoding system for photocomposition of scientific text. The main keyboard 10 includes a set of character keys 12 and operation keys 14. Actuation of any one of the character keys 12 designates one character, for example, a letter, among a specified set of characters such as the English or Greek alphabet. The operation keys 14 represent corresponding instructions concerning, for example, a desired format for printed characters other than the regular serial arrangement of successive characters in a line of running text.

An auxiliary keyboard 16 operates in conjunction with the main keyboard 10 to alter the set of characters designated by character keys 12 by specifying printing in accordance with other alphabets and fonts or a special set of mathematical symbols, and by indicating that keyed characters are to be written in various inferior and superior positions relative to respective preceding characters.

The physical structure of the key elements in keyboards 10 and 16 may comprise conventional switching apparatus for applying electrical signals to corresponding conductors when respective keys are pressed.

The keyboards 10 and 16 are electrically connected to an encoder 18 producing a multibit digital output (described in detail below) representing the condition of the keyboards 10 and 16 at any given time, that is, indicating by distinct digital combinations which keys on the keyboards 10 and 16 are actuated. The output of the encoder 18 is fed in the form of magnetic tape, for example, to a programmed decoding means 20 which automatically converts the encoded data into digital instructions for operating a photocomposer 22. The product of the photocomposer 22 is used in a conventional photo-offset press 24 in the aforementioned manner to produce printed copy. The decoding means 20 also provides an output to a teletypewriter 26 providing hard copy enabling the typist to monitor the keyboard data. Thus, the teletypewriter 26 is not driven directly by the keyboards 10 and 16, but by the programmed decoding means 20.

Figure 2:
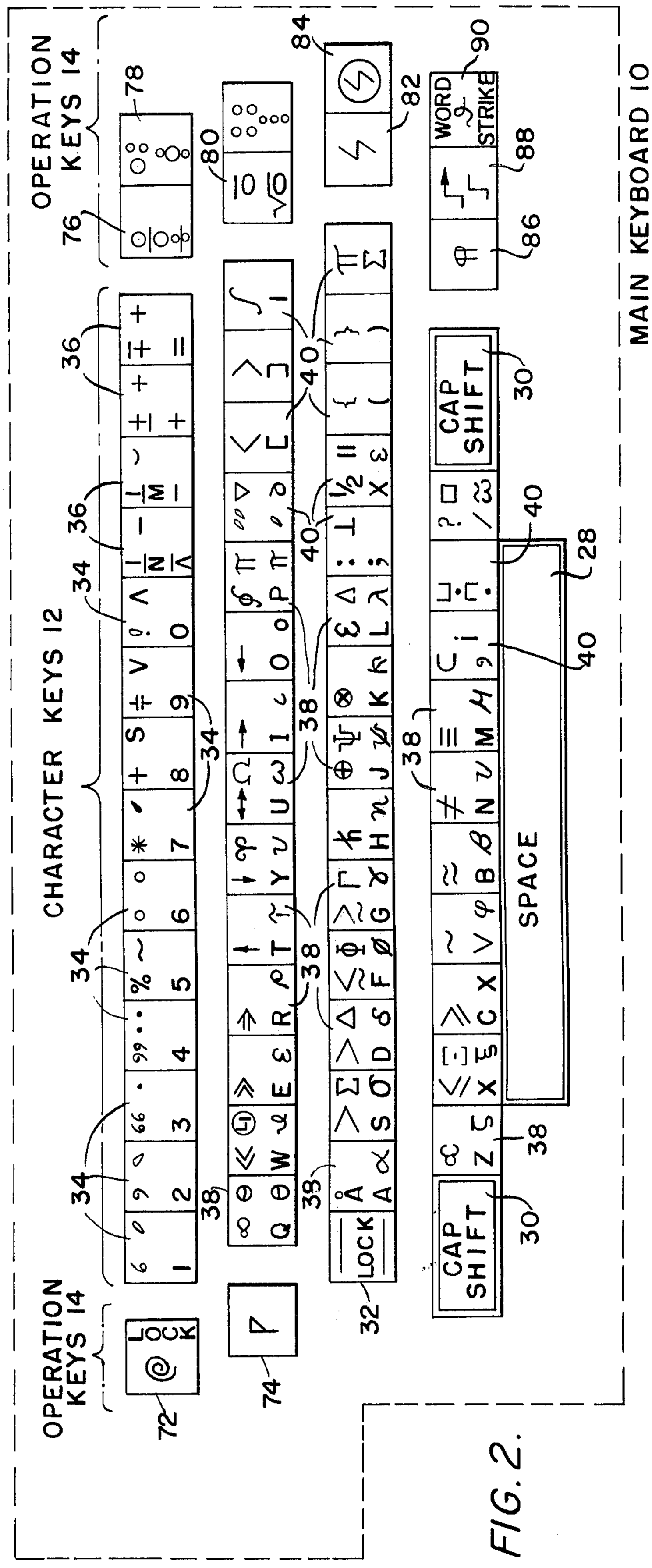
FIG. 2 is a schematic diagram illustrating the main keyboard of FIG. 1 in more detail.

The arrangement and designation of the key elements in the main keyboard 10 are shown diagrammatically in FIG. 2. While the keyboard 10 is designed to handle complex mathematical expressions without extra manual manipulation, the keyboard 10 retains many of the familiar characteristics of the conventional typewriter keyboard. For example, the space bar 28, capital-shift keys 30 and capital-shift lock key 32 operate in the customary manner. The character keys 12 are arranged as much as possible in accordance with standard typewriter keyboard format.

The first row of character keys 12 contains keys 34 each identified by a numeral from zero to nine in the lower left-hand quadrant. To the right of the keys 34 on the same row are four additional keys 36 bearing special mathematical symbols, such as the plus, minus and equal signs used most frequently in mathematical expressions. In each of the keys 34 and 36, the symbol in the upper left-hand corner is keyboarded or "accessed" by depressing a capital-shift key 30. Access to the symbols in the upper right-hand corner is provided via the auxiliary keyboard 16 (FIG. 3) as described in detail below. The keys in the remaining rows of the character key set 12 include "letter" keys 38 bearing letters of the English alphabet in the lower left-hand corner of each key, arranged in accordance with standard typewriter keyboard layout, i.e., QWERTYUIOP . . . . The remaining character keys 40 contain standard punctuation marks as well as special mathematical symbols. Each letter key 38 bears a special mathematical symbol in the upper left-hand corner and Greek symbols, corresponding generally to the English letter equivalent, in lower and upper case, in the lower and upper right-hand quadrants. In contrast to the other character keys 34, 36 and 40, the symbol in the upper left-hand corner of each letter key 38 is not accessed by means of a capital shift key 30, but by means of the auxiliary keyboard 16. The Greek symbols are also accessed by means of the auxiliary keyboard 16. If a letter key 38 is depressed simultaneously with a capital shift key 30, the capitalized version of the English letter is struck. Without the capital-shift, a letter key 38 will cause the printing of a lower case English letter.

It should be noted that a number of the letter keys 38 and special symbol keys 40 bear fewer than four symbols. In particular, the upper case Greek letter is not indicated on letter keys 38 where the missing letter duplicates the applicable English capital or is never used in scientific terminology. Several of the keys 40 bear only two symbols, for example, the four bracket keys including parentheses, braces (curly brackets), standard (rectangular) brackets, and angular brackets. Operation of these keys 40 is not affected by the auxiliary keyboard 16. The lower symbol is normally printed and the upper symbol is struck by a means of a capital-shift key 30. The only other key with a different arrangement of symbols is the colon/semicolon key 40 having in addition to these punctuation marks only a perpendicular symbol in the upper right-hand corner, accessed by means of the auxiliary keyboard 16.

Figure 3:
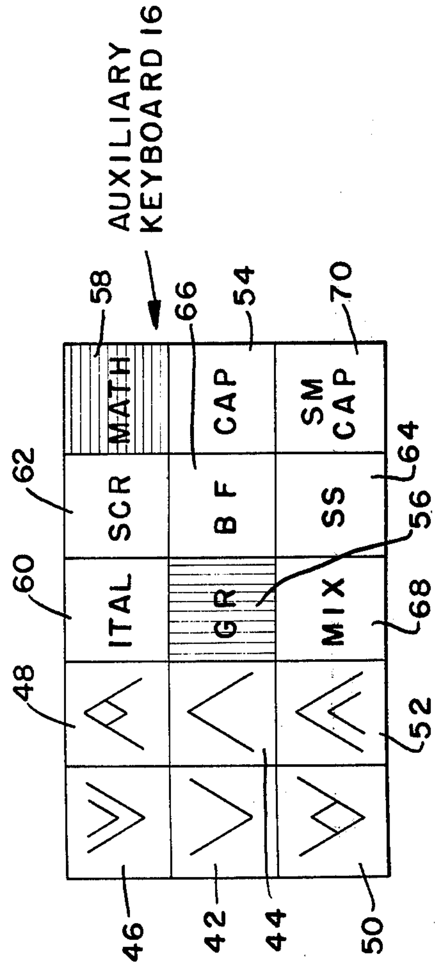
FIG. 3 is a schematic diagram illustrating the auxiliary keyboard of FIG. 1 in more detail.

The auxiliary keyboard 16, shown diagrammatically in FIG. 3, contains fifteen keys which alter the significance of the character keys 12 of the main keyboard 10, but do not by themselves cause the printing of a particular character. The auxiliary or "shift" keys operate in the same manner as a capital-shift key on a standard typewriter. That is, the shift keys are depressed simultaneously with a key on the main keyboard key 10 and may be held or locked for persistent conditions, if desired, while character keys 38 are struck. A visual indication such as a flashing light may indicate that a particular shift key is locked. Six keys 42, 44, 46, 48, 50 and 52 are used to locate characters in any of six inferior and superior positions relative to a line of text. Shift key 42 causes the character to be printed as a simple superscript to a preceding character. Shift key 44 represents a subscript. Shift key 46 represents a superscript on a preceding superscript. For example, in the expression $E^{x^2}$, the numeral 2 is a superscript to the letter *x* which is a superscript to the letter *e*. Shift key 48 represents a superscript on a subscript, for example, in $I_{x^2}$. Shift key 50 represents a subscript to a superscript, for example, in $e^{x_1}$. Key 52 represents a subscript on a subscript, for example in $I_{x_1}$.

The remaining nine keys on the auxiliary keyboard 16 represent capital-shift, bold face and special character sets and fonts. The capital key 54 duplicates the capital-shift keys 30 on the main keyboard 10, and for the purpose of coding, the keys 30 are treated as part of the auxiliary keyboard 16. The Greek key 56, colored red, and the "math" key 58, colored blue, represent special character sets consisting of the Greek alphabet and mathematical symbols respectively. On the main keyboard 10, each letter key 38 and appropriate ones of keys 40 are color-coded, as shown in FIG. 4, to allow easy correlation with the Greek and math keys 56 and 58 on the auxiliary keyboard 16. Thus, for the letter "G" key 38 in FIG. 4, the "approximately equal to or greater than" mathematical symbol in the upper left-hand corner is colored blue because it is a member of the set of mathematical symbols accessed by means of the math key 58 on the auxiliary keyboard 16. Likewise, the upper and lower case Greek letter gamma is colored red to correlate with the Greek shift key 56 because the letter gamma is a member of the Greek alphabet. In the absence of activation of either the math or Greek key 58 or 56 on the auxiliary keyboard 16, a letter "G" indicated in black will be struck by activating the "G" key 38 shown in FIG. 4.

The remaining six keys of the auxiliary keyboard 16 represent different fonts or printing styles. Thus, the "ITAL" key 60 italicizes characters. Similarly, the script key (SCR) 62 and sans serif key (SS) 64 cause printing of characters in script or sans serif form. The bold face 66 (BF) broadens the letters for emphasis where desired. The mixed key 68 (MIX) italicizes only letters, not numbers, and the small capital key 70 (SM CAP) provides a reduced version of the upper case form.

In contrast to the main keyboard 10, a plurality of shift keys on the auxiliary keyboard 16 may be depressed at once to combine their functions in modifying the characters designated by the character keys 12 on the main keyboard 10. For example, to write the Greek letter alpha as a subscript, shift keys 44 (subscript) and 56 (Greek) are depressed simultaneously with the "A" key 38 on the main keyboard 10.

The format of the monitor copy produced by the teletypewriter 26 should provide an easily comprehended replica of the indicated final form. To this end a relatively sophisticated teletypewriter programmed to use many special type faces, such as the Greek alphabet and mathematical symbols, would, of course, permit a direct indication for running text. However, since there is a practical limit to the number of special type faces which may be provided, other auxiliary indications may be substituted to alter the meaning of a standard typed character. In FIG. 5, a monitor copy format is shown, in which standard characters are typed as running text on one line with a plurality of ruled lines below corresponding to the shift keys of the auxiliary keyboard 16. For convenience in illustration, only the line for the subscript key (44) among the superior/inferior keys 42, 44, 46, 48, 50 and 52 is indicated in FIG. 5. The teletypewriter 26 is suitably modified to provide darkened areas 92 along the lines corresponding to depression of the respective shift keys. In this system, the type faces on the teletypewriter 26 need only include those provided by a standard typewriter keyboard, plus several special symbols for the operation keys 14 discussed below. Another means for indicating superior/inferior positioning is by overstruck symbols like those appearing on shift keys 42, 44, 46, 48, 50 and 52 (FIG. 3). Thus, the letter "i" as a subscript to a superscript, for example, would be typed on the teletypewriter 27 as ◊i.

The operation keys 14 on the main keyboard 10 (FIG. 2) include the following elements: to the left of the character keys 12, an escape key 72, for accessing other symbols not represented on the keyboard 10 via an auxiliary memory (now shown); a spike key 74 for marking a particular location in a line of text; and to the right of the character keys 12, a fraction key 76, a "limits" key 78, an overbar key 80, separator and terminator keys 82 and 84 for delineating component parts of an expression, a paragraph key 86 to indent the first line of a paragraph, a displayed equation/break key 88 and a deletion key 90. All of the operation keys 14 have in common the role of instructing the photocomposer 22 to carry out a function other than the direct printing of a character. (However, unusual characters can be printed indirectly by means of the escape key 72.) The simplest example is paragraph key 86 which simply instructs the photocomposer 22 to advance a predetermined number of character spaces on a new line.

The operation keys 14 are a part of the main keyboard 10. Thus, the capital shift keys 30 or 54 (keyboard 16) can be used on some of the operation keys 14, where two symbols are indicated, to access a different "instruction". As with the character keys 12 (excepting the capital shift keys 30 and 32) only one operation key 14 may be activated at a time, unlike the auxiliary keyboard 16.

The escape key 72, unshifted, indicates that what follows is an escape code which accesses some symbol or operation that is in an auxiliary memory (not shown), not on the main keyboard 10. Escape codes may consist of one or more character or operation symbols; but no escape code is an initial string of another. For example, if 006 is an escape code, then 0062 cannot be. In the shifted mode, the escape key 72 acts as a shift lock for the auxiliary keyboard 16. That is, if one or more of the shift keys on the auxiliary keyboard 16 is depressed when the escape key 72 is pressed, the designated shift will be held until an unlock code is keyed, for example, two successive strikes of the escape key 72.

The delete key 90, unshifted, can nullify or strike the last character, space, or symbol keyed on the main keyboard 10.

Capital-shifted, the delete key 90 can nullify everything back to and including the last word space. "Blue-shifted" by simultaneously depressing the math key 58 on the auxiliary keyboard 16, the delete key 90 can nullify everything back to but not including the last unshifted spike set into the text by means of the spike key 74.

The spike key 74, unshifted, inserts a marker such that the blue shifted delete key 90 can cause the deletion of all strokes after but not including the latest spike or marker.

Figure 6:
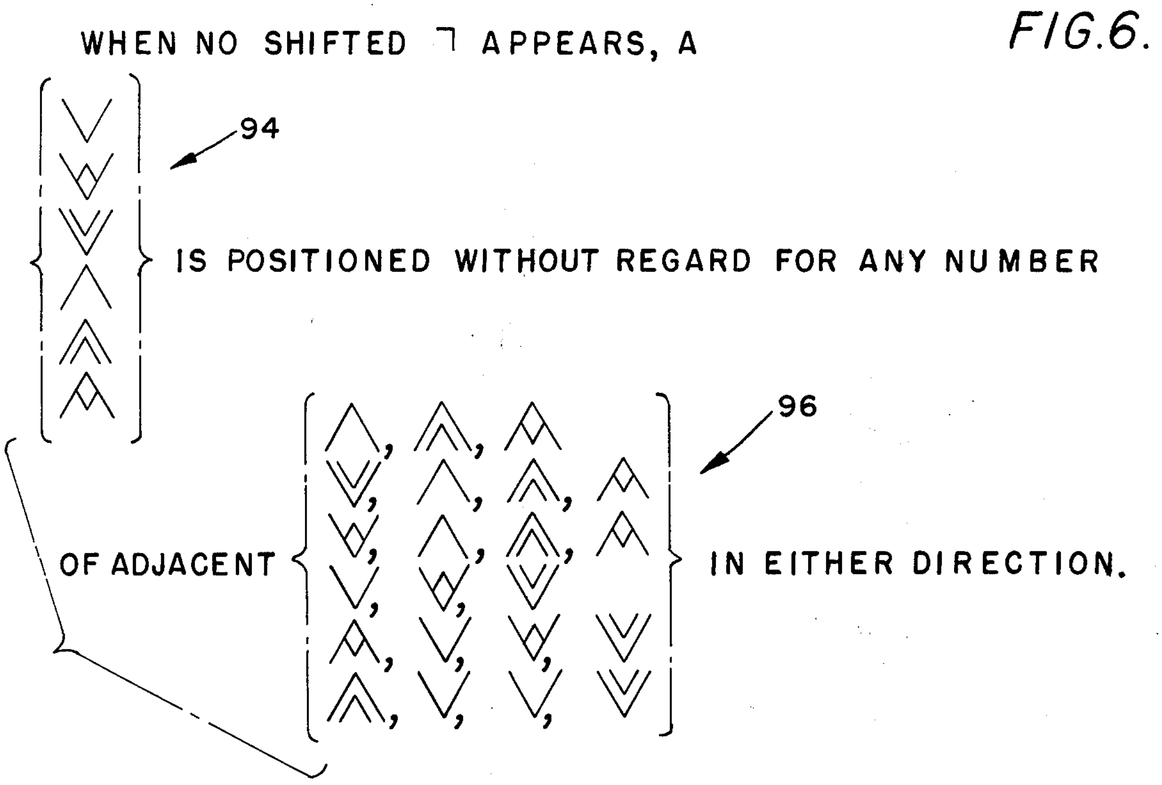
FIG. 6 is a symbolic expression of the normal rules by which superior/inferior character positions are determined in the midst of other superior/inferior characters.

A spike shifted by means of one of the superior/inferior shift keys 42, 44, 46, 48, 50 or 52 of the auxiliary keyboard 16 is used to cause a succeeding character in a cluster of superior or inferior characters to be shifted to the right of what precedes. In the absence of a shifted spike, a superscript following a subscript, for example, is positioned without regard for the preceding subscript. In writing the term $x_1{}^2$, the numeral 1 is placed as a subscript by means of shift key 44 on keyboard 16 and the numeral 2 is subsequently struck with the superscript key 42 depressed. The preceding printing of the subscript 1 is ignored in positioning the superscript 2. On the other hand, in writing the term $I_{x+1}$ preceding subscripts are not ignored. The subscript key 44 is held while the subscript $x+1$ is printed and the characters comprising the subscript are printed serially. The normal "rules" according to which preceding inferior/superior characters are ignored or taken into account is indicated by the symbolic representation in FIG. 6, in which the symbols correspond in meaning to the similarly identified key faces of the superior/inferior keys 42, 44, 46, 48, 50 and 52 of the auxiliary keyboard 16. The superscript symbol at the top of the column 94 corresponds to the top row of the "matrix" 96. Similarly, the other symbols in the column 94 correspond to respective rows of the matrix 96.

Striking the spike key 74 after a superior/inferior character 42, 44, 46, 48, 50 or 52 along with the same shift key which was applied to the immediately preceding superior/inferior character alters the normal rules for positioning the succeeding inferior/superior character by causing the succeeding character to be printed to the right of what precedes. For example, $x_1{}^2$ causes the printing of the term $x^2_1$; but $x_{1\vee}{}^2$ causes the printing of the term $x_1{}^2$, where the V-shaped overstrikes indicate simultaneous depression of the corresponding inferior/-superior key 42, 44, 46, 48, 50 or 52 on keyboard 16.

The separator and terminator keys 82 and 84 are logical punctuation marks in the routines initiated by the various operation keys 14. The display/break key 88, when unshifted, causes a break in a line and causes a new line to be started flush with the left-hand copy margin. When key 88 is capital-shifted, it initiates the routine for a displayed equation in the format whereby an equation or other mathematical expression keyboarded between the occurrence of the capital-shifted key 88 and a separator key 82 is centered and an equation-identification number is positioned flush right between the striking of the separator key 82 and the terminator key 84. The separator and terminator key strikes used in the routine for a displayed equation are those which are uncorrelated with another operation key such as the fraction key as will be explained in detail below. That is, separator and terminator key strikes may occur after the capital-shifted display key 88 in connection with multi level mathematical expressions without affecting the basic routine for a displayed equation until the occurrence of an uncorrelated separator key strike.

The operation keys 14 designated 76, 78 and 80 comprise a subset called mathematical array keys. These keys 76, 78 and 80 provide six kinds of mathematical formats. The operation associated with the upper symbol appearing on the face of each of these keys 76, 78 and 80 is accessed through the capital-shift. The mathematical array keys 76, 78 and 80 all operate in accordance with the same basic principle. The striking of one of these keys 76, 78 or 80 identifies subsequently keyed characters, up until the next succeeding terminator key 84, as members of a particular type of mathematical expression such as a fraction. In addition, an operation or routine instructed by means of one key 75, 78 or 80 can be included within another. For example, the numerator of a fraction may itself contain another fraction. This operation is assured by completing or disposing of the most recently begun mathematical array. Thus, when two mathematical array routines are initiated without a terminator key strike between them, the next occurrence of a separator or terminator key 82 or 84 will apply to the immediately preceding mathematical array instruction and will not apply to the second (less recent) preceding mathematical array instruction.

Figure 7A:
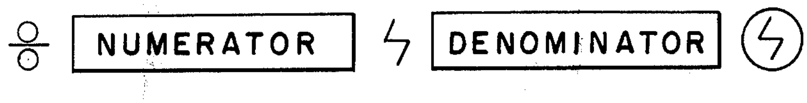
FIGS. 7A–7C illustrate the format in which lower case, numeral fractions are keyboarded.
Figure 7B:
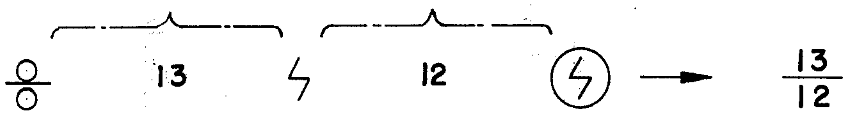

The unshifted fraction key 76 provides for the composition of a "case fraction" for making numeral fractions one-line high. The full routine for case fractions is indicated in FIG. 7A. The case fraction routine is initiated by striking key 76, unshifted, followed by the numerator, in FIG. 7B the number 13, followed by striking the separator key 82, followed by the denominator, in this case 12, followed by striking the terminator key 84, whereby the case fraction routine is ended and subsequently key characters are printed as serial text.

Figure 7C:

To facilitate the keyboarding of simple numeral fractions, especially in context with regular textual matter, the system is designed so that if striking the terminator key 84 is omitted, the denominator will end before the first non-numeral; and, if striking the separator key 82 is omitted, the numerator will consist of the first numeral only. This simplified operation is depicted in FIG. 7C for the fraction 1/30. After the case fraction symbol is struck the characters 1, 3, 0 and X are sequentially struck. The separator key 82 need not be struck between the 1 and the 3 because the numerator is supposed to consist of a single digit. The terminator key 84 need not be struck because the fraction is not followed by a numeral.

Figure 8A:
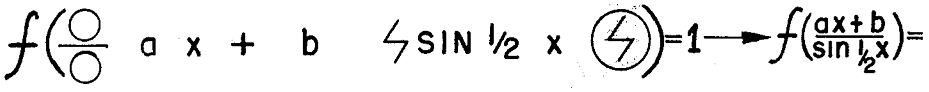
FIGS. 8A and 8B illustrate examples of keyboarded built-up fractions.
Figure 8B:
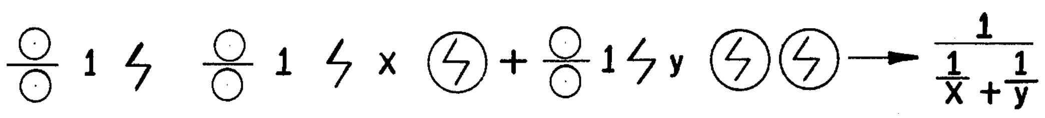

The routine for making three-line high, "built-up" fractions is accessed by pressing the fraction key 76 in the upper case (capital-shifted) condition. The format for key-boarding a built-up fraction is exactly the same as that shown in FIG. 7A except for the striking of the initial upper case fraction symbol instead of the lower case symbol. The numerator and denominator are designated by the interposed separator key 82 and the end of the fraction is designated by the terminator key 84. Two examples of the typing sequence are shown in FIGS. 8A and 8B. It should be noted that the case fraction "½" in FIG. 8A can be keyboarded directly by one of the character keys 40 on the main keyboard 10 without using the case fraction routine. The expression in FIG. 8B represents a compound fraction. For the fractions 1/x and 1/y in the denominator, two separate, "internal", built-up fraction routines are used. The terminator key 84 is struck twice at the end of the expression because the first strike correlates with the fraction routine for 1/y and the second and last strike correlates with the overall fraction routine, referring back to the first occurrence of the fraction symbol, because the other two included fraction routines have been closed.

Figure 9A:
FIGS. 9A–9D are examples of keyboarded expressions containing a symbol with centered limits.
Figure 9B:
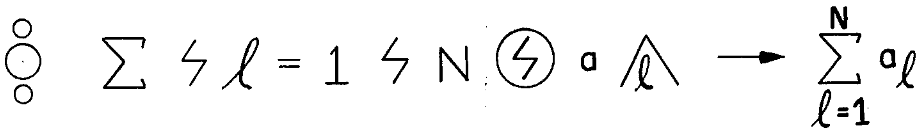
Figure 9C:
Figure 9D:
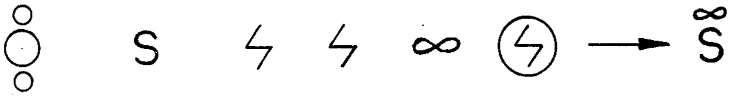

The limits key 78 applies to the positioning of upper and lower limits for specific mathematical operators. In particular, the limits key 78 in its lower case condition establishes the routine for centering upper and lower limits with respect to "series operators", summation (indicated by a capital sigma or "S") and multiple product (indicated by a capital pi). The basic format for centered limits (lower case key 78) is depicted in FIG. 9A with three examples provided in FIGS. 9B, 9C and 9D. After striking key 78, the main symbol or operator, such as sigma, is keyed, then the separator key 82 followed by the lower limit, then the separator key 82 is struck again followed by the upper limit, and finally the terminator key 84 is struck. A difference between the format of this operation and that of a built-up fraction should be noted. As the main symbol can be one of a plurality of symbols such as sigma it must be specifically designated by an extra key strike. In addition, the separator key 82 must be struck twice to indicate the upper and lower limits. In contrast, the built-up fraction operation requires that the separator key 82 be struck only once and the symbol, that is, the horizontal line dividing the numerator and denominator, need not be typed in because it is always the same; its length and position are automatically calculated from the size of the components of the fraction. The examples in FIGS. 9C and 9D illustrate omission of one of the limits.

Figure 10A:
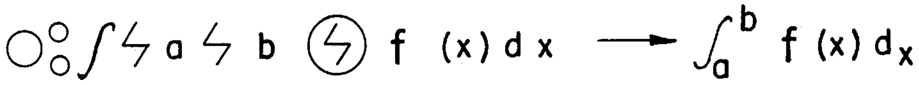
FIGS. 10A and 10B are examples of keyboarded expressions containing a symbol with right-hand limits.
Figure 10B:
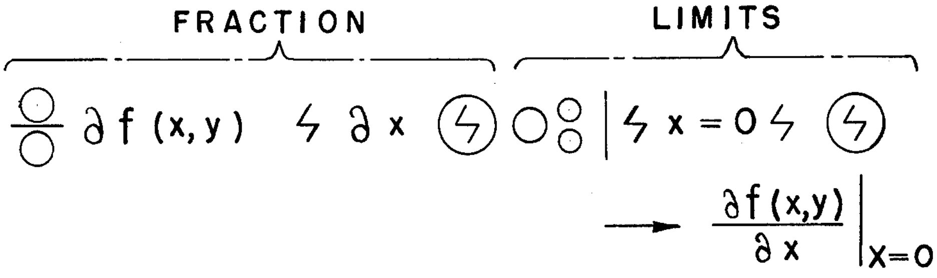

When limits key 78 is struck in the upper case condition, the right-hand limits routine is initiated. Except for the appearance of the upper case symbol on key 78 the format is exactly the same as that for the centered limits, the lower case version of key 78. Right-hand limits apply for the most part to the integral sign, but are also common in indicating the computation of the value of an expression when a variable therein is specified or the difference in value when two values for a variable are specified. The shorthand expression for this computation is a vertical line with right-hand limits. Two examples are shown in FIGS. 10A and 10B. In FIG. 10B, the first portion of the keyboarded expression deals with the built-up fraction for a partial derivative of a function and the second portion deals with the lower right-hand limit for the vertical bar.

Overbar key 80 in the unshifted lower case condition establishes the routine for a "roofed" radical. The format consists of pressing the unshifted overbar key 80 followed by the radicand (i.e., the expression whose root is to be taken) followed by the terminator key 84. Thus, in keyboarding the expression "square root of (X+Y)", the unshifted key 80 would be struck followed by X+Y followed by the terminator key 84. Like the fraction routine, the operator — here the sign for the roofed radical — changes only in size, not in character, and since the sizing of the roofed radical can be automatically determined by the size of the radicand and the neighboring characters, keying the symbol itself is not necessary.

Overbar key 80, when shifted to the upper case, establishes the routine for barring a symbol or plurality of symbols with a vinculum. The format, similar to that for the roofed radical, consists of keying the shifted overbar key 80, followed by the barred object, and finally the terminator key 84. For example, the expression $\overline{AB}$ is keyboarded by striking the shifted key 80 followed by the term AB, followed by the terminator key 84.

Figure 11:
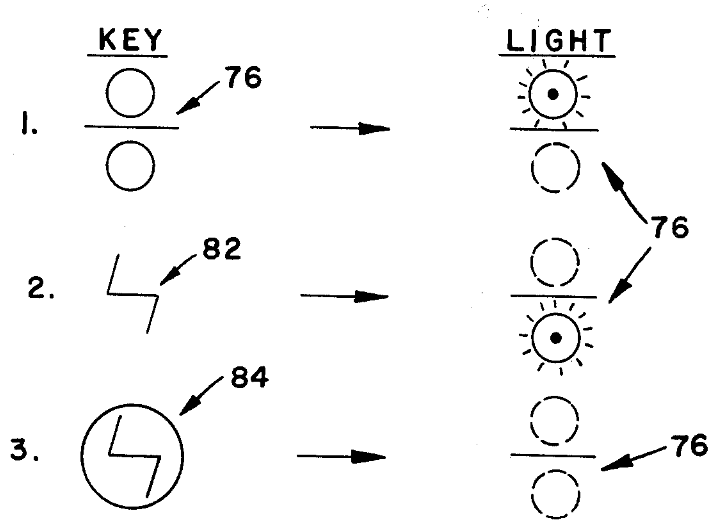
FIG. 11 is a diagram illustrating an indicator system for one of the operation keys of the keyboard of FIG. 2.

A lighted indication can be provided on the main keyboard 10 if desired to indicate which component part of an expression is being keyboarded at a given time. An example of this system is illustrated in FIG. 11 for use with the shifted fraction key 76. This indication is particularly useful when writing a complicated built-up fraction. When the shifted fraction key 76 is first struck, a blinking light illuminating the upper circle of the fraction symbol is activated. After the numerator is entered, the separator key 82 is struck and the flashing light for the upper circle is deactivated and another one for the lower part of the circle for the symbol remains activated until the terminator key 84 is struck at the end of the fraction.

In FIG. 1, the encoder 18 provides a multibit output to the decoding means 20 indicative of the actuation of keys on the main keyboard 10 and auxiliary keyboard 16. The output of the keyboards 10 and 16 may be encoded in many different ways, but the preferred system is to use 16 bits to identify the data, with seven bits allocated to the keyboard 10 and the remaining nine bits allocated to the auxiliary keyboard 16. The first seven bits for the main keyboard 10 are arbitrarily determined and preferably follow the American Standard Code for Information Interchange (ASCII) to the extent possible. Other multibit codes are of course possible. Except for the capital shift keys 30 on the main keyboard 10, which are duplicated on the auxiliary keyboard 16, only one key at a time can be pressed on the main keyboard 10. Thus, to encode data from the main keyboard 10, it is essential only that there are enough bit positions to distinguish each key on the main keyboard 10.

In addition to the sixteen data lines, one "strobe" or "flag" line is ordinarily required. The strobe line goes low (in a "negative logic" system) when one (and only one) key on the main keyboard 10 is depressed, signaling the decoding means 20 that data are available.

Figure 12:
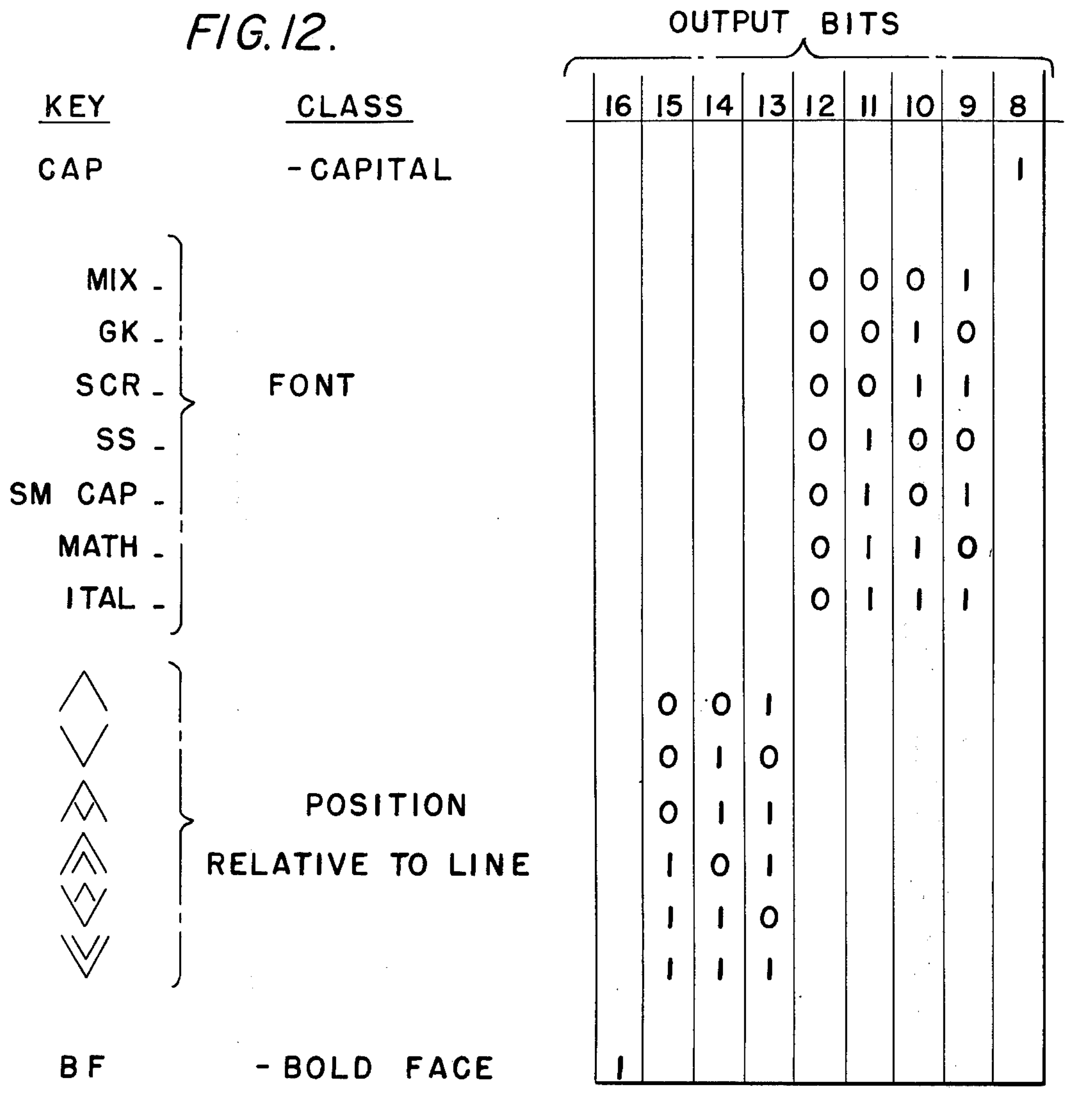
FIG. 12 is a table illustrating the auxiliary keybaord coding.

The coding for the nine output bits representing the auxiliary keyboard 16 is given in the table in FIG. 12. The keys of the auxiliary keyboard 16 are divided into four separately encoded classes. In particular, a capital-shift (key 30 on main keyboard 10 and key 54 on the auxiliary keyboard 16) is exclusively designated by a single output bit, number 8. The font keys (keys 56, 58, 60, 62, 64, 68 and 70 of keyboard 16) are exclusively encoded in bits 9 through 12. Bit 12 is zero for each of the seven keys, but allows other fonts to be added later approximately doubling the number illustrated for keyboard 16. The inferior/superior position keys 42, 44, 46, 48, 50 and 52 of keyboard 16 are ascribed to bits 13 through 15, and the bold face key 66 is exclusively designated by output bit 16. The reason why the fifteen keys of the auxiliary keyboard 16 are not arbitrarily designated by means of 4 or 5 bits is that several keys can be depressed at the same time on the keyboard 16. In fact, the encoding system permits any one key from one class to be actuated at the same time with any other single key from any or all of the other classes. For example, the capital, Greek, subscript and bold face keys can be simultaneously actuated along with a single key on the main keyboard 10. Thus, in this hypothetical situation, five keys would be depressed at the same time. The only invalid combination would appear to be the capital and the math key depressed at the same time, although there are other combinations which may be superfluous or unused in actual practice. The keyboard encoding system for the auxiliary keyboard system 16 is primarily designed to afford maximum versatility in keyboarding special characters.

The sixteen line output and strobe line from the encoder 18 are fed to the decoding means 20 which may comprise a general purpose or special purpose computer programmed to convert the data represented by the 16 output bits to instructions for the teletypewriter 26 and photocomposer 22. For example, the condition of the sixteen line output during one strobe time may indicate to the decoding means 20 that the "G key" 38 of the main keyboard 10 is depressed along with the Greek key 56 of the auxiliary keyboard 16. In response to this input data, the decoding means 20 would instruct the photocomposer 22 to print a small gamma selected, for example, from a special grid containing the lower case Greek alphabet. Simultaneous depression of an inferior/superior key 42, 44, 46, 48, 50 and 52 on the keyboard 16 with one of the letter keys 38 on the main keyboard 10 would cause the decoding means 20 to instruct the photocomposer to alter the position of the character relative to the line accordingly. In responding to a particular mathematical display format indicated by one of the operation keys 14, for example the fraction key 76, a particular subroutine stored in the decoding means 20 would be accessed by striking the operation key 76. The subroutine for a built-up fraction, for example, might require, as an illustration, a pair of program loops for the numerator and denominator of the fraction. That is, a command to print the following symbol in the next character space above the line separating the numerator and denominator would be repeated until the separator key 82 were struck thereby switching to the next loop in which the command to print the following symbol in the next character space below the line would be repeated for each successive character until the occurrence of the seven bit code identifying the terminator key 84.

The auxiliary keyboard 16 in conjunction permits maximum versatility and speed in typing special symbols. The ease with which, for example, two successive capital Greek superscripts can be indicated (i.e., by holding three auxiliary shift keys with one hand and keying the letters with the other) is in definite contrast to previous systems. Technical typists can adapt to the new system with little training. Moreover, for displayed mathematics, the task of handsetting is eliminated by the disclosed system, which allows mathematical expressions to be typed as if they were running text.

The invention may be embodied in other specific forms without departing from its spirit or essential characteristics. For example, those skilled in this art will recognize that certain minor changes in keyboard layout, such as relocating the operation keys 14 on the auxiliary keyboard 16, may in practice be found to have some advantage. In addition, while the auxiliary keyboard 16 is designed primarily for scientific subject matter, other fonts and character sets besides Greek and mathematical symbols can be added or substituted. Beyond this, it is also emphasized that the keyboarded data can be simply stored for later use or manipulated in some other manner besides being used directly to drive a photocomposer 22.

The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

We claim:

1. A system for typographic composition of scientific text, comprising a keyboard having character keys, a plurality of format keys indicating forms for different mathematical expressions, and two format delineator keys including a separator key for delineating the component parts for a plurality of mathematical expressions represented by said format keys and a terminator key indicative of the end of an expression with one of said formats, and digital means responsive to operation of said keyboard for producing an output in response to any one of said format keys indicating that subsequently keyed characters are to be printed in one location determined by the format represented by said one format key until a separator key strike, if any, whereupon subsequently keyed characters are to be printed in another location according to said format until said terminator key is struck ending the influence on said subsequently keyed characters of the format represented by the immediately preceding format key.

2. The system of claim 1, wherein said keyboard also includes a displayed equation key, said digital means being responsive to said displayed equation key for producing an output indicating that an expression keyed between the striking of said displayed equation key and said separator key, uncorrelated with any format keys within said expression, is to be positioned in a predetermined manner.

3. The system of claim 2, wherein said digital means output further indicates that an expression keyed between said uncorrelated separator key strike and an uncorrelated terminator key, is to be printed in another predetermined position.

4. A system for typographic composition of scientific text, comprising a keyboard having a set of character keys ordinarily representing a particular alphabet, a plurality of auxiliary shift keys including a capital-shift key, a plurality of special font keys for varying the identity of said character keys, and a plurality of superior/inferior character position keys for varying the position of keyed characters relative to a line, encoding means operatively connected to said keyboard for providing a multibit encoded output representing the actuation of keys on said keyboard, a first exclusive subset of the bits in said encoded output distinctly representing the actuation of character keys, a second exclusive subset of said bits representing the condition of said capital-shift key, a third exclusive subset of said bits, similarly representing any one of said plurality of font keys, and a fourth exclusive subset of said bits similarly representing any one of said plurality of character position keys, whereby said multibit output represents not only the character key actuated on said keyboard but also and simultaneously any combination of a capital-shift key, one of said font keys and one of said character position keys.

5. The system of claim 4, wherein said character position keys include six keys respectively indicative of three superior positions and three inferior positions relative to a line for a simultaneously keyed character.

6. The system of claim 5, wherein said keyboard further includes key means for indicating a change in the rules applicable to determining the lateral position of a superior/inferior character in the midst of other superior/inferior characters.

7. The system of claim 5, wherein said keyboard further includes key means indicating that a subsequently struck superior/inferior character is to be shifted to the right of what precedes.

8. The system of claim 4, wherein said keyboard includes key means for locking any of actuated auxiliary shift keys.

9. The system of claim 4, wherein the character keys on said keyboard bear a plurality of symbols color-coded with said special font keys.

10. A keyboard comprising a set of character keys and a set of operation keys including a plurality of format keys indicating different mathematical expression formats, a separator key for delineating the component parts of a format, and a terminator key for ending a format, said format keys including a multipart format key bearing a legend having at least two distinct parts indicative of a mathematical expression format having at least two corresponding parts, visual indicators associated respectively with the parts of said legend, and control means operatively connected to said indicators responsive to the striking of said multipart format key for activating one of said indicators, said control means being responsive to the striking of said separator key for deactivating said one indicator and activating another one of said indicators, said control means being further responsive to the striking of said terminator key for deactivating said indicators.

* * * * *